United States Patent [19]

Hall, Jr. et al.

[11] Patent Number: 4,647,546

[45] Date of Patent: Mar. 3, 1987

[54] POLYCRYSTALLINE CUBIC BORON NITRIDE COMPACT

[75] Inventors: H. Tracy Hall, Jr., Orem, Utah; Jean-Michel Cerceau, Seyssinet, France

[73] Assignees: Megadiamond Industries, Inc., Provo, Utah; Societe Industrielle de Combustible Nucleaire, Velizy Villacoubly, France

[21] Appl. No.: 666,459

[22] Filed: Oct. 30, 1984

[51] Int. Cl.⁴ ............................................. C04B 35/58
[52] U.S. Cl. ........................................ 501/96; 51/307; 51/309; 75/244
[58] Field of Search .................. 501/96; 51/307, 309; 423/290; 75/244

[56] References Cited

U.S. PATENT DOCUMENTS

| Re. 30,503 | 1/1979 | Lee et al. | 51/307 |
| 2,947,617 | 8/1960 | Wentorf, Jr. | 51/307 |
| 3,150,929 | 9/1964 | Wentorf, Jr. | 23/191 |
| 3,701,826 | 1/1971 | DeVries et al. | 423/290 |
| 3,743,489 | 7/1971 | Wentorf, Jr. et al. | 51/307 |
| 3,768,972 | 10/1973 | Taylor et al. | 23/300 |
| 3,913,280 | 10/1975 | Hall | 51/307 |
| 3,918,219 | 11/1975 | Wentorf, Jr. et al. | 51/307 |
| 3,959,443 | 5/1976 | Kabayama | 423/290 |
| 4,110,084 | 8/1978 | Lee et al. | 51/307 |
| 4,220,455 | 9/1980 | St. Pierre et al. | 51/295 |
| 4,334,928 | 1/1982 | Hara et al. | 75/238 |
| 4,343,651 | 8/1982 | Yazu et al. | 75/238 |
| 4,361,543 | 11/1982 | Zhdanovich et al. | 423/290 |
| 4,375,517 | 3/1983 | Watanabe et al. | 501/87 |
| 4,394,170 | 7/1983 | Sawaoka et al. | 51/309 X |
| 4,401,443 | 8/1983 | Lee et al. | 51/307 |

FOREIGN PATENT DOCUMENTS 58-61254  4/1983  Japan ..................... 501/96
2048927A 12/1980 United Kingdom .

OTHER PUBLICATIONS

Chem. Abstracts, vol. 72:139166p, from the Journal of the Ceramic Society of Japan, article by H. Saito, 1970.

Primary Examiner—William R. Dixon, Jr.
Assistant Examiner—Steven Capella
Attorney, Agent, or Firm—Willian Brinks Olds Hofer Gilson & Lione Ltd.

[57] ABSTRACT

The invention is a process for preparing a sintered polycrystalline compact of cubic boron nitride, the compact produced by the process, and articles comprising the compact. A mixture is formed of cubic boron nitride grains and from 5 to 20 volume percent of binder material, or sintering aid, consisting essentially of silicon and an aluminum-containing material selected from the group consisting of aluminum, aluminum nitride, aluminum diboride, and mixtures thereof. The mixture is subjected to elevated pressure and temperature conditions sufficient to melt the binder material and at which the boron nitride is thermodynamically stable. The elevated pressure and temperature conditions are maintained for a time sufficient to sinter the compact. The compact is characterized by substantial intergranular CBN-CBN bonding, and has superior wear and impact resistance, thermal conductivity and stability.

23 Claims, 4 Drawing Figures

POLYCRYSTALLINE CUBIC BORON NITRIDE COMPACT

FIELD OF THE INVENTION

This invention relates to sintered polycrystalline abrasive compacts of cubic boron nitride for use as machining tools, abrasives, wire dies, wear parts, heat sinks, and the like. More particularly, this invention relates to a process for preparing a sintered polycrystalline compact of cubic boron nitride, with substantial intergranular bonding between the cubic or other high pressure form of boron nitride grains, to the compact produced thereby, and to useful articles made with such compacts.

BACKGROUND OF THE INVENTION

The high pressure forms of boron nitride, known as cubic boron nitride ("CBN") and wurzitic boron nitride, are surpassed only by diamond in hardness and have a wide variety of uses as machining tools, abrasives, wire dies, wear parts, heat sinks, and the like.

Wurzite boron nitride, typically formed by shock or explosive techniques, has a hardness equal to CBN and can be substituted or mixed with CBN in most applications. It is thermodynamically unstable relative to CBN under conditions favorable to sintering and will revert to CBN in the presence of catalyst-solvents.

CBN, in particular, is preferred to diamond in working with ferrous metals because it is chemically more stable than diamond, has a higher temperature threshold for conversion to its hexagonal or graphitic form, and is not catalytically degraded by hot ferrous metals, as is diamond. In the applications mentioned above, the primary qualities desired for a polycrystalline compact tool are wear resistance (to increase tool life), thermal stability (to prevent failure of the tool at high temperatures), thermal conductivity (to rapidly remove excess heat from the tool and working piece), impact resistant (to allow deep cuts in a work piece and interrupted cuts), and a low coefficient of friction in contact with the workpiece. While CBN itself possesses each of these qualities to a significant degree, whether a polycrystalline compact of CBN as a whole possesses them will depend largely on the characteristics of the other materials that make up the compact—i.e., binder materials, substrates, and the like.

One particularly severe application for CBN compacts is the high-speed machining of hardened tool steels or nickel-based super-alloys. If the tool remains sufficiently sharp and maintains a low coefficient of friction in contact with the workpiece, most of the cutting energy is transferred to the immediate zone destined for removal, rather than to the tool or workpiece. As a result, only the immediate zone destined for removal is softened, and most of the heat is carried off in the extremely hot, glowing chip. In general, the highest possible volume concentration of CBN has been favored for maintaining a sharp cutting edge under these conditions.

An application presenting contrasting requirements is the rough machining of cast iron parts or for parts containing holes, slots, etc., where the interrupted cut generates high shock forces. In the prior art, compacts having a lower concentration of CBN and a higher concentration of a non-metallic binder have been favored for such applications. At present no known compact of the prior art is capable of performing well under both sets of conditions.

Various attempts have been made to produce from the high pressure forms of boron nitride polycrystalline CBN compacts which meet both of the above sets of requirements. Although it is possible to form a sintered compact of CBN with no binder material under conditions of high pressure and temperature, strongly adherent surface oxides of boron inhibit intergranular bonding and make it difficult, if not impossible, to obtain adequate compact strength. Various binder materials are thus incorporated, either to enhance intergranular bonding or to surround the grains with a continuous matrix.

The binder material should possess two general sets of qualities: (1) mechanical and chemical properties as close to those of CBN as possible, so as not to deteriorate tool performance, and (2) characteristics enabling manufacture of the compact, such as a melting point at readily obtainable temperatures or good plasticity at such temperatures, limited but not excessive chemical reactivity toward CBN, and most preferably, catalytic/solvent activity for conversion of hexagonal boron nitride (the graphitic low pressure form of boron nitride, referred to as HBN) to CBN. This latter characteristic will enable grain regrowth and intergranular bonding under conditions of pressure and temperature for which CBN is thermodynamically stable. Prior art binder compositions have, in the main, possessed significantly more attributes from one of these sets of properties than from the other. As a result, these compacts tend to exhibit characteristics more suitable either for abrasion resistance (high CBN concentrations with catalytic binders) or impact resistance (lower CBN concentration with ceramic, non-catalytic binders), but not both.

Most known catalyst-solvents for conversion of HBN to CBN are totally unsuited for use as binders because of poor mechanical properties or poor chemical stability in the presence of air, water, cooling fluids, brazing fluxes, etc. Such catalyst-solvents are taught by U.S. Pat. Nos. 2,947,617 to Wentorf, and 3,701,826 to DeVries et al., which specify alkaline, alkaline earth, tin, lead, and antimony metals and their compounds, especially nitrides and boron nitrides, and U.S. Pat. No. 3,150,929 to Wentorf, which specifies actinide or lanthanide metals.

Silicon and aluminum-containing materials, the powders and alloys of which constitute the binder of the present invention, have certain desirable properties which have led to their use, separately, in prior art binder compositions. We consider first the use of aluminum in the prior art.

The use of aluminum-ferrous metal alloys as catalyst-solvents for conversion of HBN to CBN is taught, without reference to binder applications, by H. Saito, Journal of the Ceramic Society of Japan, "Yogyo Kyokai Shi", Vol. 78, pp. 1-8, 1970 (with iron), abstracted in Chemical Abstracts, Vol. 72:139166p, and by Taylor et al., U.S. Pat. No. 3,768,972 (with iron, cobalt, or nickel). These catalyst-solvent alloys have improved hardness and strength and higher melting points than those catalyst-solvents mentioned above and are less reactive toward air. U.S. Pat. No. 3,918,219 to Wentorf et al., also discloses the use of aluminum alloys with cobalt, nickel, or manganese for making a CBN compact by means of conversion of HBN to CBN. The well-known function of aluminum in removal of surface boron oxides is taught in these specifications. This compact has poor wear resistance because the synthesis process never goes to completion, and because the shrinkage associated with conversion of HBN to CBN leaves the CBN grains completely surrounded by catalyst, preventing inter-granular bonding. Another process for making a CBN compact by synthesis (i.e., from HBN as a starting material) is U.S. Pat. No. 4,361,543 to Zhdanovich et al., which allows a wide variety of catalysts, including aluminum, silicon, their mixtures and alloys, and aluminum-cobalt with hafnium diboride additive, and specifies that pressures of 80–120 kbar and temperatures of 1800°–3000° C. are required for complete conversion. Such high pressures are unattainable in commercial practice since routine operation of the well-known belt or multi-anvil types of commercial high pressure equipment is limited to approximately 65 kbar. In general, compacts utilizing HBN as a starting material are inferior to those utilizing CBN crystals, and must be made at commercially impracticable conditions.

Use of transition metal-aluminum alloy catalysts for sintering of pre-existing CBN grains is taught by U.S. Pat. No. 3,743,489 to Wentorf et al. The compact of this invention, believed to be marketed under the trade name "BZN", has excellent wear resistance in machining of extremely abrasive materials as a result of high concentrations of CBN and true inter-granular bonding, but it suffers from low impact resistance, resulting in brittleness and chipping in interrupted cut applications. It additionally suffers from temperature instability, which is harmful to its performance at the highest speeds. The large difference in coefficient of thermal expansion between the cobalt-aluminum binder and the CBN phase apparently causes cracking at high temperatures as the network of metal expands against the network of CBN grains. The metal phase also has a tendency to stick to the workpiece, especially at the higher temperatures desired for machining hard alloys, thereby increasing the heating of tool or workpiece to the point of damage. Additionally, certain toolmaking processes, such as brazing with stronger, higher temperature alloys or mounting of compacts with powder metal sintering steps, must be avoided.

An example of a low pressure compact utilizing aluminum alloys with high aluminum concentration is taught by U.S. Pat. No. 4,110,084 to Lee et al., and the reissue thereof, U.S. Pat. No. Re.30,503, wherein aluminum or an alloy of aluminum with certain transition metals infiltrates the CBN mass. The binder is present in high volume concentration, and it has a low melting point, high coefficient of sticking or friction versus metallic workpieces and high thermal expansivity, thereby severely limiting tool applications.

Use of aluminum as an aid in bonding CBN to a second refractory phase under high pressure-temperature conditions is taught by U.S. Pat. No. 3,944,398 to Bell. Bell teaches the use of a binder material consisting of a boride, nitride, or silicide refractory substance and a solvent substance of aluminum, lead, tin, magnesium, lithium, or alloys thereof. Bell also teaches that the refractory substance may be a silicon nitride powder mixed with silicon, boron, and boron carbide, all in powdered form or various mixtures or reaction products of silicon nitride, alumina and/or magnesium oxide. See from Col. 1, l. 53 to col. 2, l. 5. The preferred embodiment of Bell, believed to be marketed under the trade name "Amborite," employs silicon nitride as the second refractory substance and aluminum as the "solvent". Bell teaches that substantially all of the aluminum reacts with the silicon nitride to form aluminum nitride and unidentified silicon compounds. This marketed compact does have good thermal stability. It performs well in aggressive cutting operations of hard ferrous alloys wherein the small portion of the workpiece which encounters the tool is heated to softening temperatures. However, the relatively high content of the binder compounds, which are considerably softer than CBN thereby imparting the desirable impact-resistance, interferes with true intergranular bonding and makes this compact less abrasion resistant than the marketed "BZN" compact, because the individual CBN grains are most subject to pull-out by the abrasive particles of the workpiece.

Use of pure aluminum as a binder for CBN is taught by UK patent application GB No. 2,048,927A, Mar. 18, 1980, to Wilson. Here also substantially all of the aluminum is taught to be converted to aluminum nitride and/or aluminum diboride by reaction with CBN. Although the compact of this UK application exhibits increased brittleness and therefore less impact resistance than the silicon nitride-aluminum nitride bonded compact of Bell, its greater CBN concentration and resulting improved thermal conductivity and thermal resistance is evidenced by the turning test of example 7 of this UK application, in which the product of that invention performed better in aggressive turning of hardened tool steel than compacts produced according to U.S. Pat. No. 3,944,398 to Bell and U.S. Pat. No. 3,743,489 to Wentorf et al.

U.S. Pat. No. 4,343,651 to Yazu et al., teaches that the CBN content may be increased to more than 80 volume percent by adding aluminum compounds to the binder material which is a carbide, a nitride, or a carbonitride of a group IVb and Va transition metal. This provides a compact more suited for abrasive wear applications; cutting of sintered WC/Cobalt of 15 wt % cobalt is given as one example. A substantial quantity of aluminum (up to 20 weight percent of the binder) is added to facilitate sintering, as plastic flow of CBN and metallide binder is insufficient to fill all the porosity. Addition of copper or iron is also preferred to suppress formation of brittle titanium borides.

We next consider the prior-art use of silicon as binder for CBN compacts. Silicon and its alloys with metals (other than with aluminum) have been utilized as binders for CBN principally because of their reasonably attainable melting temperatures, their hardness and abrasion resistance, their low coefficient of thermal expansion, and especially because of their lack of reactivity towards CBN.

CBN compacts utilizing silicon and silicon alloys with certain transition metals are taught by U.S. Pat. Nos. 4,401,443 to Lee et al. and 4,220,455 to St. Pierre et al., wherein a pre-compacted mass of coated CBN crystals is infiltrated with silicon or a silicon alloy. These compacts are formed at pressures far below those required for conversion of HBN to CBN. Under such conditions, binders having moderate reactivity toward CBN and hence solubility for CBN would promote the reverse transformation of CBN to HBN. No such conversion occurs with silicon; indeed the reactivity is so low that a coating (tungsten, molybdenum, or carbon, respectively) is required to enable effective bonding of the CBN grains to the silicon binder necessary. The resultant high concentrations of binder, combined with lack of direct inter-granular bonds, leads to rapid erosion in more abrasive applications.

Alloys of aluminum and silicon are taught to be effective catalysts for conversion of HBN to CBN in U.S. Pat. No. 3,959,443 to Kabayama. The specification teaches very low catalytic activity for pure silicon but substantially higher activity for alloys of silicon with aluminum, aluminum nitride, and aluminum boride.

U.S. Pat. No. 4,334,928 to Hara et al., discloses CBN compacts made with binder materials selected from carbides, nitrides, carbonitrides, borides, and silicides of group IVa, Va and VIa transition metals. Hara et al. teaches that the compact should contain less than 80 volume percent CBN. Hara also teaches that a catalyst, such as aluminum and/or silicon, may be added to the binder in a small amount. Enhanced bonding between the CBN grains and the metallide matrix is thereby achieved. X-ray diffraction shows neither free silicon nor aluminum nitride in the compact, but rather titanium-aluminum and silicontitanium compounds. The Hara et al. invention neither intends nor achieves substantial direct CBN-CBN bonding, in part due to the low concentration of CBN. Because of the low volume concentration of CBN and lack of intergranular bonding, wear resistance in abrasive applications is poor, but the excellent thermal stability of this compact makes it suitable for the hot-chip mode of cutting.

U.S. Pat. No. 4,375,517 to Watanabe et al. also discloses a high (20 to 80%) volume fraction of hard metal-based binder, in this case a cermet containing titanium carbide and/or nitride, a ferrous metal, and molybdenum or dimolybdenum carbide. As with the Hara et al. patent, addition of a very small quantity of aluminum-silicon alloy to the cermet binder is found to enhance adhesion of the dispersed CBN grains to the continuous cermet phase. Presence of ferrous metal in 3 to 20 weight percent is harmful to the thermal stability, and the high binder concentration is harmful to abrasion resistance. Thus the Watanabe et al. compact does not perform well at either of the extremes of cutting tool applications.

SUMMARY OF THE INVENTION

This invention relates to a process for preparing, at elevated temperature and pressure conditions, a sintered polycrystalline compact of the high pressure forms of boron nitride, preferably cubic boron nitride (CBN), and also to the compact produced by the process. A binder, or sintering aid, consisting essentially of silicon and an aluminum-containing material selected from the group consisting of aluminum, aluminum nitride, aluminum diboride, or mixtures thereof is utilized to bond together a mass of high pressure form boron nitride grains, such as CBN, with substantial intergranular bonding between adjacent grains within the mass. The result is a compact with a substantially continuous boron nitride crystalline matrix, with reaction products of the aluminum/ silicon binder with the boron nitride grains interspersed throughout the crystalline matrix. The resulting compact has superior wear resistance (typifying those compacts with the intergranular bonding of CBN grains), impact resistance, thermal stability, and thermal conductivity.

The method of preparing the compact of the present invention involves forming a mass of high pressure form boron nitride grains, preferably CBN, to which a minor amount of binder consisting of silicon and an aluminum-containing material is added by means of either (1) mixing a powdered form of the binder intimately with the boron nitride grains, or (2) placing the binder material of silicon and the aluminum-containing material immediately adjacent to the mass of boron nitride grains and allowing the melted binder to infiltrate the boron nitride grains during the elevated pressure and temperature stage of the process. As used herein, "minor" means no more than about 25% by volume of the compact. Preferably, the binder constitutes between 3 to 20 volume percent of the mass.

The binder materials employed in this invention consist essentially of silicon and an aluminum-containing material, which may be present in the form of mixed powders of aluminum or aluminum compounds and silicon, alloys of aluminum and silicon, or combinations thereof. The relative concentration of the aluminum or aluminum compounds in the binder, while functioning well in the range of from 5 to 50 percent by weight, is preferably from 15 to 30 percent. The aluminum-containing material is selected from the group consisting of aluminum, aluminum nitride and aluminum diboride.

After combining the boron nitride grains with the binder, the mass or masses are placed in a protective container, which is then placed in the working chamber of a suitable high pressure, high temperature apparatus. The container and its contents are then subjected to elevated pressure conditions in excess of 20 kbar, preferably to between about 45 and 65 kbar, and then to elevated temperature conditions, preferably to between 1200 and 1600° C. These conditions are in the region of CBN crystal stability, and provide melting of substantially all of the silicon/aluminum-containing material binder. Elevated pressure and temperature is maintained for a period of between approximately 1 and 10 minutes to sinter the CBN crystals, after which the temperature and then the pressure are reduced and the compact recovered.

The resulting polycrystalline boron nitride compact possesses advantageous qualities not found simultaneously in the prior art; namely, (1) a high volume CBN concentration with intergranular CBN to CBN bonding, resulting in high resistance to binder erosion by abrasive materials and high thermal conductivity, together with (2) high wear resistance under aggressive conditions in cutting of ferrous alloys, (3) high thermal stability, (4) low coefficient of friction versus ferrous metals, (5) lack of chemical or metallurgical reaction with the workpiece, and (6) good impact resistance. The coexistence of these properties in a single compact provides a compact which can be economically used in a variety of end uses and for a longer period of time, without machine down time due to tooling changes.

Additional features and advantages of the invention are described in and will appear from the description of the preferred embodiments and from the drawings.

DESCRIPTION OF THE PREFERRED EMBODIMENTS

Figure 1:
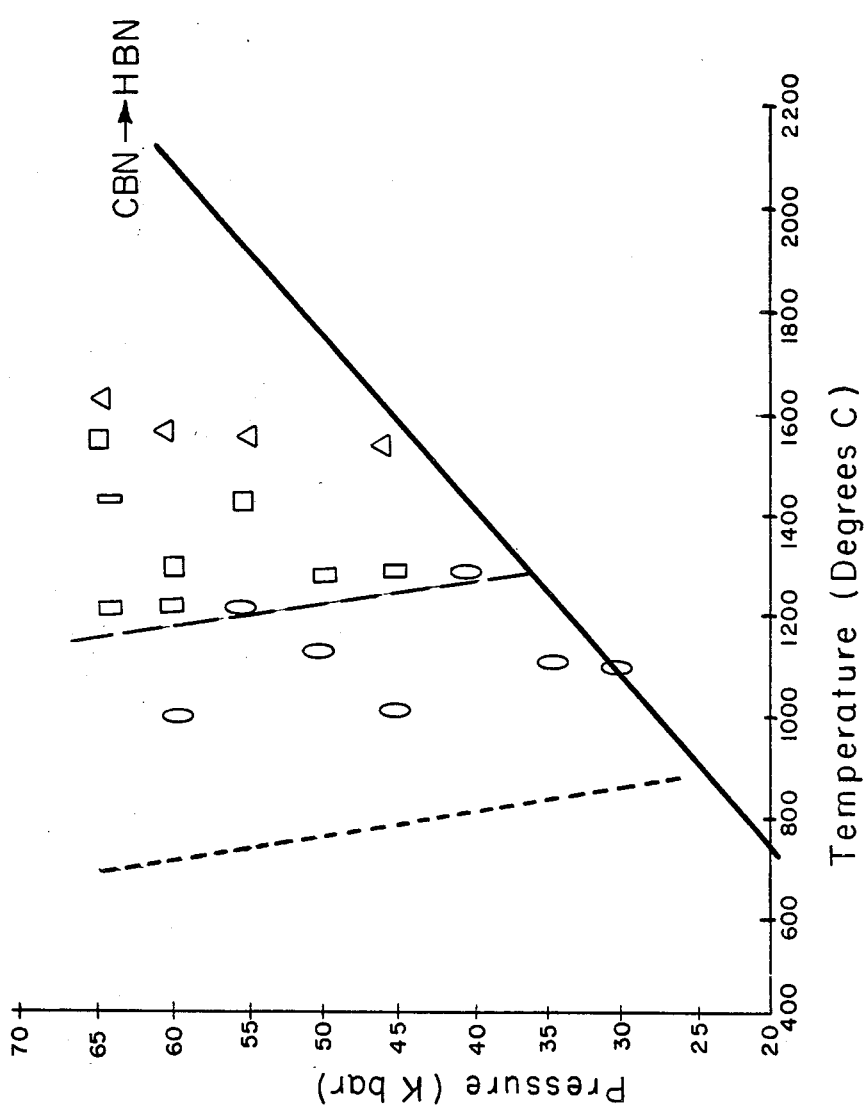
FIG. 1 is a pressure vs. temperature diagram showing the range of thermodynamic stability of CBN and experimental results establishing the conditions necessary for substantial densification of CBN by means of plastic flow in the absence of binders, and thus the optimum percentage of binder to be mixed with the CBN grains.

In the preferred embodiments of the invention, cubic boron nitride (CBN) powder of a grain size suitable for the intended application of the compact is blended with a range of finer CBN grains to provide maximum packing density and is thoroughly blended with a powder of the binder. As finer-grained compacts give greater impact resistance and perform suitably in aggressive cutting applications, and give smoother surfaces in finishing applications, a CBN grain size less than about 15 microns is preferred. Most preferred is a mixture of about 75% of about 10-12 micron size CBN grains, with a semi-log distribution of smaller grain sizes down to about 1 micron.

The preferred binders are mixtures of silicon and aluminum powders, powdered alloys of aluminum and silicon, such as $Al_{0.3}Si_{0.7}$, or mixtures thereof. Most preferably, the binder is a mixture of silicon and aluminum powders. The preferred binder should be substantially free of any elements other than aluminum, silicon, nitrogen, or boron.

The amount of the binder material present in the preferred CBN-binder mixture may vary from about 3 to 20 volume percent. Preferably, the binder content of the mixture is greater than about 10 volume percent. However, coarser-grained compacts require a somewhat smaller volume percent of binder and may be preferred for the most abrasive applications.

The aluminum content of the binder material may vary from about 5 to 50 weight percent. Binders with about 15 to 30 weight percent aluminum are preferred.

The powders may be heated in vacuum, either separately or after mixing, so as to remove adsorbed water vapor and other volatile impurities, but the chemical reducing power of the aluminum phase is sufficient to handle minor amounts of such impurities, and in practice this step may be avoided.

Powder mixtures have been heated in vacuum, in argon, hydrogen, and ammonia, without significant variation in product quality. Powders heated above 800° C. or in ammonia have shown considerable reaction of Al with BN or $NH_3$ to form AlN and $AlB_2$ as evidenced by x-ray diffraction of the powders prior to pressing. Thus the substitution of aluminum nitrides or borides for elemental aluminum is considered within the scope of the invention. Such a treatment prior to pressing or substitution of AlN and $AlB_2$ may be desirable in order to avoid the presence of oxidized aluminum, especially when using fine powders. Silicon, however, must be present in its elemental form.

The mixture is then placed in a can or cup of a material suitable to contain the compact while it is being sintered and to protect it from impurities generated by heating the high pressure cell. Careful selection of container materials will minimize infiltration of undesirable elements into the compact or, alternatively, provide for infiltration of possible desirable elements. Molybdenum has been found particularly suitable, but nickel, tantalum, tungsten, and stainless steel may also be used. Titanium and zirconium enclosures, on the other hand, have been found to be too reactive toward CBN in the presence of molten silicon-aluminum to be of utility in the present invention. The cup or can may be approximately of the same net shape as the finished compact, in order to reduce finishing costs, or it may be subdivided with discs, dividers, molds, etc., to produce multiple near-net shapes.

As an alternative to mixing the binder and the CBN, the binder material may be placed as a separate mass (whether as mixture, pre-alloyed powder, or preformed solid mass) adjacent to the CBN grains where it will infiltrate the mass of CBN grains during processing, aided by its low viscosity, high wetting action, and the driving force of the extreme high pressure. Since prewetting of the CBN grains prior to final compaction is thought to be important to the practice of the invention, mixing of powders is preferred.

Ceramic, metallic or cermet substrate materials may be placed adjacent to the CBN mass if a composite compact having certain mechanical characteristics or special (especially non-planar shape) is desired, and a barrier material may be provided to prevent undesirable reactions between the CBN mass and the substrate material. However, we have found the compact of the invention to be sufficiently strong and impact resistant to be used directly as a tool insert without need for an integrally-bonded support mass. Accordingly, only cost (i.e. minimizing CBN usage), shape requirements, or toolmaking considerations would favor such composite configurations.

The cup or can enclosing the mass to be sintered is surrounded by any well-known plastic pressure-transmitting medium (a salt such as NaCl is preferred, but hexagonal boron nitride, talc, etc. may also be utilized) and placed within a graphite or metallic heater, surrounded by a pressure-transmitting and gasket-forming medium such as pyrophillite, and placed in the chamber of a suitable high-pressure, high-temperature apparatus. One such suitable combination of pressure-cell and apparatus is illustrated in U.S. Pat. No. 3,913,280 to Hall, Sr., FIGS. 2 and 3, and is incorporated herein by reference. After pressure in excess of about 20 kbar is applied to bring the sample into the region of CBN thermodynamic stability, which is well known to those skilled in the art, electrical resistance heating is applied to melt the binder and sinter the compact to maximum density. The preferred sintering time at the preferred conditions of 45-60 kbar and 1250°-1450° C. is about five minutes; longer times will impart only small increases in density and extent of CBN-CBN grain growth. Lower pressures or temperatures will typically require longer sintering time.

After sintering is complete, the heating current is slowly removed and the sample is allowed to cool to below 200° C., after which the applied pressure is removed and the can or cup is recovered from the cell. The compact is recovered from the can by grit blasting or acid dissolution, following which it is ground or lapped with diamond abrasives to its final form.

A detailed discussion of the figures, together with examples for practice of the invention, will illustrate how the advantages of the invention are achieved.

While not wishing to be bound by any theory it is theorized that the excellent catalyst-solvent activity of the aluminum-silicon binder is a result of (1) a melting point significantly lower than the plastic flow point of CBN, providing for catalytic activation of the surfaces of the CBN grains prior to their complete compaction and enabling complete filling of pores subsequent to attainment of maximum density, (2) substantial wetting action for CBN, both as a result of reduction of surface oxides of boron by aluminum and because of the large difference between the melting temperature and the sintering temperature, and (3) significant solubility in the liquid alloy for boron and nitrogen as a result of the moderate chemical activity of the diluted aluminum atoms, thereby enabling reversible dissolution and recrystallization of CBN. Note that silicon alone has no reactivity towards or solubility for CBN and aluminum alone is too reactive. It is the combination of these materials which provides for the desired moderate catalyst/solvent activity.

The desirably low melting point of the binder phase of the invention is attributable to the combination of two effects. First is the reduced melting point behavior typical of any liquid-phase miscible system in the absence of strong chemical interaction. A 30 weight percent aluminum alloy becomes entirely molten at about 1230° C., almost 200 degrees below the normal melting point of silicon. (M. Hansen and K. Anderko, "Constitution of Binary Alloys," 2nd edition, McGraw-Hill, 1958, p. 133). The second effect, that of pressure, reduces the melting point further because molten silicon, like the liquid phases of water, tin, and a few other materials, has a higher density than its solid phase. (See the phase diagram "p:Al-Si" in "Handbook of Binary Phase Diagrams, W.G. Moffat, General Electric Company, 1981, and "Behavior of the Elements at High Pressures, J.F. Cannon, J. Phys. Chem. Ref. Data, Vol. 3, p. 79, 1979). From these sources a further reduction in melting point to about 1000° C. can be estimated for the same 30 weight percent aluminum alloy at 55 kbar—more than 400 degrees lower than with pure silicon at atmospheric pressure.

The experiments summarized in FIG. 1 were performed on CBN powders loaded into molybdenum cans without binder, in order to establish minimum pressure-temperature conditions consistent with good plastic flow and compaction of CBN grains. All experiments were performed in the region of CBN stability, above the indicated equilibrium line. The triangles represent essentially 100% density, the squares 95–100% density, the rectangles 90–95% density, and the ovals 80 to 90% density. It is interesting to note that above a minimum threshold pressure of about 20 kbar, increased temperature has a much stronger influence on plastic flow of CBN than does increased pressure. Although the mechanism of catalytic recrystallization alone will eventually provide substantial intergranular bonding, this is greatly enhanced if the catalytically activated surfaces of the CBN grains are forced plastically into areas of larger contact with each other in the presence of the saturated liquid binder. The region to the right of the dashed line and above the equilibrium line represents the most preferred pressure-temperature region for significant plastic flow, whereas the region to the right of the dotted line represents conditions where CBN densities in excess of about 80 percent are attainable without binder. Since the binder becomes liquid at temperature to the left of the dotted line, where porosity of 10 percent or greater still exists, and since it is desirable to have all surfaces of CBN exposed to binder before they are forced into greater area of contact with each other, a practical maximum density of about 90 to 95% is achieved when binder is present. (The hydrostacity of the liquid binder inhibits further plastic compaction.)

X-ray diffraction examination of the compact of the invention reveals the principal diffraction lines of cubic boron nitride, silicon, aluminum nitride, and molybdenum disilicide, one possible line for silicon hexaboride, and two or three weak, unidentified lines, probably from an unknown boron-containing phase. No aluminum lines were evident, indicating that the reaction:

$$BN + Al \rightarrow AlN + B$$

has gone almost to completion. Thus it can be seen that one novel feature of this invention is the transformation of one binder component, aluminum, from a soft, sticky, material with high coefficient of expansion—all undesirable features—into a ceramic possessing desirable chemical and mechanical properties in the finished compact, but without eliminating its catalytic activity. The residual silicon is hard, refractory, does not stick to or significantly react with hard ferrous alloys, and also possesses a low coefficient of expansion. Thus the invention embodies a unique binder which is liquid and catalytic at sintering conditions, but which has the desirable properties of ceramics in the final product.

Additionally, the incipient atmospheric pressure melting point (eutectic) of the binder in the final product is greatly increased from that of the starting materials, from the below-600° C. CBN/Al/Si eutectic to a much higher (as yet undetermined, but greater than 1200° C.) CBN/AlN/Si/B eutectic.

The MoSi2 results from the reaction of silicon with the container, and imparts certain beneficial properties. First, it reduces the frequency of cracking of the compact. Increased time at temperature also decreases this cracking tendency. Second, the MoSi2 phase is believed to impart additional hardness, reduced coefficient of friction, higher melting point, reduced coefficient of thermal expansion, and other beneficial properties to the silicon-rich portion of the binder phase. Electron microprobe measurements show that the Mo concentration is greatest near the outer surfaces of the compact, but it is found in lesser concentration throughout—evidence of the high diffusion rates occurring with this binder system at high pressure and temperature. (It should be noted that in almost all high-pressure, high-temperature processes, the extent of interaction of the sample with the container is higher than without application of pressure, and alloying of the sample with the container is almost unavoidable.)

Figure 2:
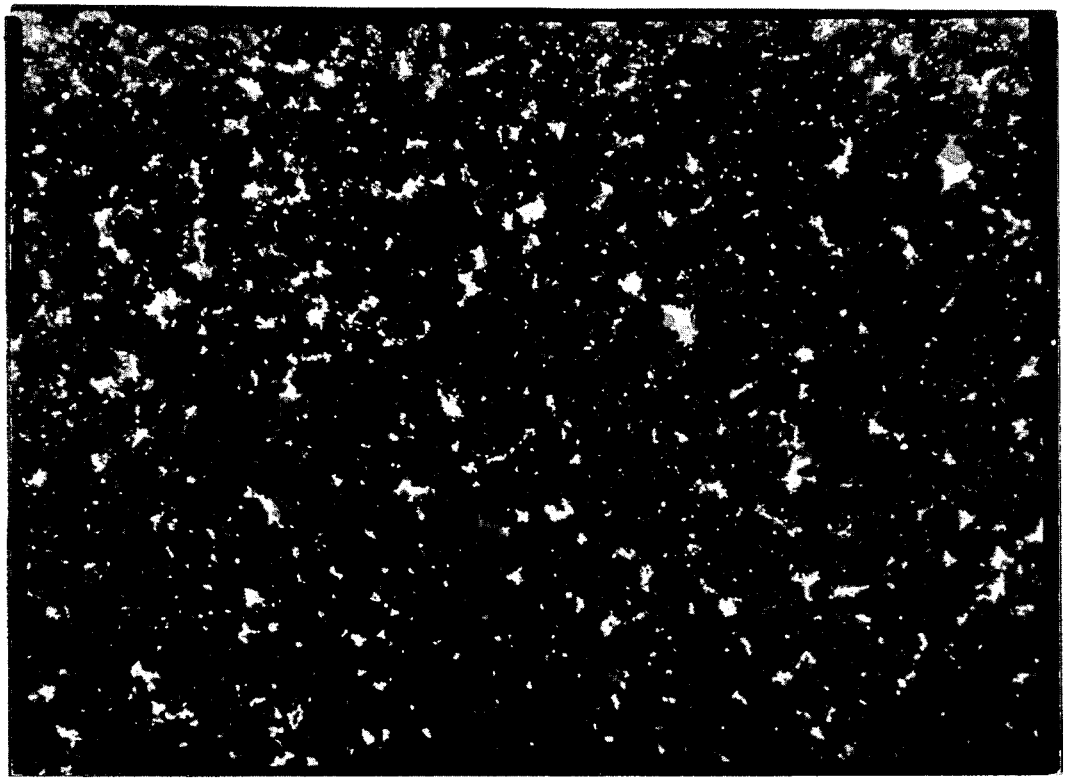
FIG. 2 is a photomicrograph of the structure of the present invention, showing intergranular bonding of the CBN particles, and also bonding of the CBN particles to the binder phase.

FIG. 2, which is a photomicrograph of a CBN compact made according to the present invention, demonstrates the extensive intergranular bonding of CBN grains which is achieved by practice of the invention. A continuous network of dark gray to black CBN grains is evident, with all of the porosity filled with binder. The random orientation of the CBN grains imparts resistance to fracture under impact, because cracks tend to terminate at the grain boundaries. The absence of any voids, which could serve as stress risers, also contributes to its impact strength.

The isolated white particles are believed to be a silicon-rich phase, including Si, possibly MoSi2, and an unidentified Si-B phase, while the isolated light gray particles are believed to be AlN. Close examination of the larger pores indicates that the light gray phase has a well-defined hexagonal habit, typical of AlN. It appears to have deposited from dissolved material diffusing toward it from some distance rather than to have resulted from instantaneous localized reaction with the CBN, as evidenced by its random, infrequent occurrence, sharply-defined boundaries with both the white and the CBN phases and the retention of CBN crystal habit at these zones of contact. This indicates also that it probably formed during the slow cooling step and remained mostly in solution during the high temperature portion of the cycle. That the white phase solidified in an amorphous or micro-crystalline phase after the light gray phase crystallized is evidenced by its own lack of crystalline habit and its complete filling of the irregularly-shaped pores.

In the absence of silicon the aluminum would have immediately reacted to form an immobile, solid, non-catalytic phase of AlN intervening between the CBN grains and preventing intergranular growth. Although the formation of AlN increases the binder melting point above its initial melting point, the binder of the present invention nevertheless remains molten, thereby enabling reversible dissolution and recrystallization of CBN and formation of true intergranular bonds.

Figure 3:
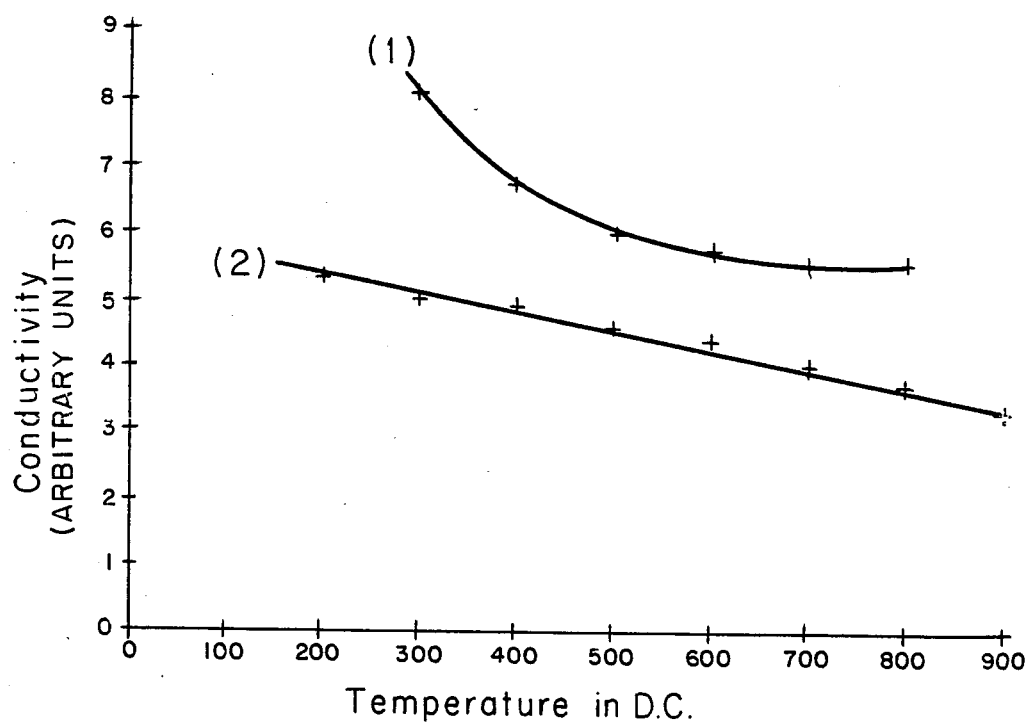
FIG. 3 shows the relative abrasive wear resistance values for a compact of the present invention against a diamond wheel for various relative concentrations of silicon and aluminum, and for various concentrations of binder.

FIG. 3 shows that the thermal conductivity of the compact of the invention (in arbitrary units) plotted along line 1 as compared to that of a CBN compact with a ceramic type binder, marketed by DeBeers under the tradename "Amborite" plotted along line 2. The higher thermal conductivity of the compact of the invention is attributable both to the higher CBN concentration and to the CBN-CBN bonding. This attribute, in connection with thermal stability, contributes to tool performance under deep cutting conditions. The compact of the invention has been heated to 1200° C. in air for 15 minutes with no perceptible weight loss or gain and with no degradation of cutting performance.

The following examples demonstrate the practice of the preferred embodiments of the invention.

EXAMPLES 1-26

A mixture of CBN particles having an average size of 8 microns (50% 8-12 micron, 50% 4-8 micron) was intimately mixed with aluminum and silicon powders in a WC/Co-lined ball mill with WC/Co balls. A measurable but negligible amount of WC and Co contamination resulted. The composition of aluminum and silicon and the volume percent of binder utilized (based on the densities of Al and Si and the weights used) are given in Table 1. In each case the mixed powder was cleaned alternately in hydrogen and vacuum at 800° C. for 30 minutes and then loaded into a molybdenum tube divided in the middle with one Mo disc and sealed at each end with two end discs. Additional contamination protection was provided with a shallow external Zr cup. In some cases molybdenum-foil forms in the shape of triangles, squares, etc. were used to partition one or more of the two CBN discs into near-net shapes. The sealed load was surrounded with NaCl pressure-transmitting medium, loaded into the pyrophillite cell and cubic press described in U.S. Pat. No. 3,913,280 (Hall, Sr.) and sintered at 65 kbar and 1400° C. for 3 minutes. Power was applied immediately after pressurization, and full temperature, as indicated by a thermocouple, was achieved in approximately 20 seconds. At the end of 3 minutes, the power was cut to zero, and after allowing the sample to cool, the pressure was remove, and the sample recovered by etching away the Mo can, divider, and forms with dilute aqua-regia.

Figure 4:
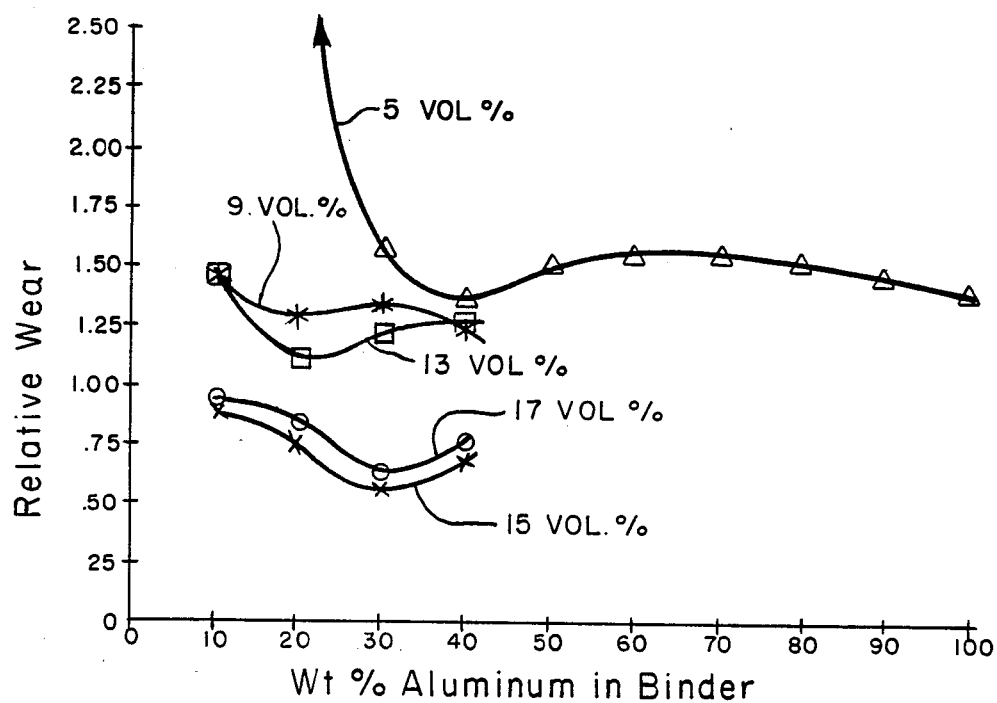
FIG. 4 is a graph showing the relative variation of thermal conductivity versus temperature for the preferred embodiment compared to a prior art compact.

Cutting elements in the form of ⅜" diameter discs were formed by grinding with diamond, and the relative wear performance was evaluated by working the disc across the face of a freshly-cleaned plated diamond wheel with a constant force for a given time. The lowest wear ratios given in TAble 1 represent the best wear performance, with a value of 1 representing the wear of a CBN compact marketed under the trade name "Amborite". The wear data are plotted in FIG. 4, with triangles representing 5% (by volume) binder, asterisks: 9%, squares: 13%, circles: 17%, and X's: 15%. Examples 20, 21, 22, 24, 25, and 26 represent preferred embodiments of the invention.

TABLE 1

| Ex. No. | Binder Vol. % | Wt % Al | Wear Ratio | Density (g/cc) | Extent of cracking |
|---|---|---|---|---|---|
| 1 | 5 | 10 | >5 | | 1 |
| 2 | 5 | 20 | 3.57 | 3.42 | 0 |
| 3 | 5 | 30 | 1.56 | 3.43 | 0 |
| 4 | 5 | 40 | 1.35 | 2.48 | 0 |
| 5 | 5 | 50 | 1.54 | | 0 |
| 6 | 5 | 60 | 1.54 | | 1 |
| 7 | 5 | 70 | 1.54 | | 0 |
| 8 | 5 | 80 | 1.53 | | 0 |
| 9 | 5 | 90 | 1.46 | | 0 |
| 10 | 5 | 100 | 1.46 | | 0 |
| 11 | 9 | 10 | 1.45 | 3.42 | 1 |
| 12 | 9 | 20 | 1.27 | 3.40 | 1 |
| 13 | 9 | 30 | 1.33 | 3.47 | 0 |
| 14 | 9 | 40 | 1.21 | 3.44 | 1 |
| 15 | 13 | 10 | 1.47 | 3.40 | 2 |
| 16 | 13 | 20 | 1.09 | 3.46 | 2 |
| 17 | 13 | 30 | 1.25 | 3.43 | 2 |
| 18 | 13 | 40 | 1.26 | 3.34 | 2 |
| 19 | 15 | 10 | .89 | | 2 |
| 20 | 15 | 20 | .78 | | 1 |
| 21 | 15 | 30 | .57 | | 0 |
| 22 | 15 | 40 | .69 | | 1 |
| 23 | 17 | 10 | .94 | 3.43 | 2 |
| 24 | 17 | 20 | .84 | 3.41 | 1 |
| 25 | 17 | 30 | .62 | 3.45 | 0 |
| 26 | 17 | 40 | .76 | 3.41 | 2 |

Note that for any given volume percent of binder, a minimum in wear occurs for an intermediate weight percent of aluminum in the binder, and that for these conditions of 65 kbar and 1400° C., the optimum wear resistance occurs at approximately 15 volume percent binder and 30 weight percent aluminum. Less binder appears to be insufficient to fill all the porosity or provide complete wetting or catalytic activation of the CBN phase: excess binder reduces the amount of contact area available for CBN-CBN bonding. It is thought that too little aluminum provides insufficient catalyst/solvent activity for the binder, whereas too much aluminum supersaturates the binder with AlN and interferes with catalytic recrystallization of CBN.

The frequency or severity of cracking given in table one is given as follows: 0: none, 1: mild, and 2: considerable. At the time these experiments were performed, the beneficial results of slow cooling (and to a lesser extent, longer sintering times) had not yet been discovered, and the frequency/severity of cracking indicated in the table is for quenched compacts. Note that higher volume percent of binder generally contributes to increased cracking. In many cases the cracks were filled with solidified binder material, and in only a few cases was the cracking so extensive as to prevent accurate wear measurements on a crack-free portion of the compact. Most of the cracked pieces retained sufficient strength to be ground and utilized as cutting tools.

Even though at non-optimum aluminum compositions the preferred volume content of binder (15%) results in the worst cracking, at the preferred composition of 30 weight percent aluminum there is no cracking—an indication that the increased wear resistance at the preferred composition derives in large measure from the strength of the CBN-CBN bonding.

EXAMPLE 27

As a further example of a preferred embodiment of the invention, a binder composition and concentration equivalent to the most wear resistant of the preceding examples (#21: 15 volume percent binder and 30 weight percent aluminum) was selected. CBN crystals of average size 9 microns were size-graded for optimum packing density as follows: 72% (by weight) 8–12 micron in size, 23% 4–8 micron, and 5% 2–4 micron. The CBN was thoroughly mixed with the binder (using acetone in a carbide-lined centrifugal ball mill with carbide balls). After air-drying the mixture, moisture and other adsorbed impurities were removed by treating the powder mixture alternately in vacuum and hydrogen at 800° C. for 30 minutes. A molybdenum cup (0.625" diameter, 0.19" high, 0.010" wall), was placed in the bottom of a matching steel die and 1.7 grams of the powder mixture were added, capped by a molybdenum disc with a 0.615" diameter and 0.010 thickness, and the powder was precompacted with approximately 40,000 p.s.i. applied pressure. After removal from the die, the cup was sealed with an overlapping molybdenum cup. Two such assemblies were placed in a cubic high pressure cell of pyrophyllite as described in U.S. Pat. No. 3,913,280 (in a somewhat larger cell than in the previous examples), with salt as the electrical insulation for the indirect heater and as the internal pressure-transmitting medium. After pressurization to approximately 55 kbar, the temperature was raised to approximately 1450° C. in about 30 seconds, held for an additional 3 minutes, and then lowered to about 500° C. over 3 minutes, after which the pressure was removed and the sample recovered by dissolving the molybdenum cup in 50/50 hydrocholoric acid-nitric acid mixture. The recovered samples approximated the form of a right circular cylinder with slightly concave walls, diameter of 0.52" to 0.53", and 0.14" high, with a density of 3.42g/cm$^3$. (The theoretical density for this composition, based on residual CBN, AlN, Si, and B, would be 3.34: the higher density is attributable to alloying of as much as 20% of the Si with Mo to form MoSi2, and possibly also to an unknown dense B-containing phase.)

Each of the discs was ground with a diamond wheel into indexable cutting insert of diameter 0.500" and thickness of 0.125", with a sharp, unchamfered cutting edge, clamped into a standard toolholder with a 15° negative rake angle such as is used for indexable carbide inserts, and used to cut D-2 steel hardened to a bulk hardness of Rockwell 60. Cutting speed was 700 feet/min. with a depth of cut of 0.2mm and a feed of .05mm/revolution, with no coolant or lubricant. A glowing, red-to orange hot chip was formed, but after several passes the workpiece remained below about 70° C. (cool enough to touch). The finish obtained on the workpiece was very smooth, and there was no chipping of the insert. The amount of wear on the insert, as measured by the length of the wear land, was significantly less than that exhibited under identical conditions by the prior art CBN compact marketed under the trade name "Amborite", but was slightly more than the wear exhibited by the prior art CBN compact marketed under the trade name "BZN".

In cutting tests involving interrupted cuts, (15 impacts/sec. with 15,000 total impacts at a depth of cut 0.1mm) the wear and resistance to chipping of this compact equalled the impact resistance of the "Amborite" compact and greatly exceeded that of the "BZN" compact.

The compact of example 27 also withstood exposure to a temperature of 1200° C. in air for fifteen minutes with no discernable loss of performance in cutting hardened steel nor detectable change in any other properties.

Thus the object of providing a CBN compact exhibiting improved abrasion resistance together with improved impact resistance and high temperature stability has been realized. At the 15 volume percent level of binder cited in the cutting tests, an excellent all-purpose tool, useful both for interrupted roughing cuts and high velocity machining is obtained—whereas the prior art forced selection of different binder materials for these machining processes, which often are taken in sequence on a single workpiece. The process improvements taught in example 27 have not yet been applied to the full range of volumes and concentrations explored in examples 1–26, and it is likely that they will result in further increases in abrasion resistance and a shift of the optimum abrasion resistance to lower volume of binder. Lower volume concentration of the aluminum-silicon binder may also be achieved by infiltration from an external mass instead of by mixing. Given these possibilities, it can be seen that the present invention not only combines the separate advantages of the prior art products, but may lead to significant improvements in both sets of properties at once.

It is possible within the scope of this invention to practice a wide variety of binder compositions, binder materials, and temperature-pressure conditions and cycles which will achieve the same objective as these examples, and the foregoing examples are designed to be illustrative, rather than limiting.

While cubic boron nitride is the preferred high pressure boron nitride, the invention also may be carried out using wurzitic boron nitride or a mixture of cubic and wurzitic boron nitride as a starting material.

We claim:

1. A process for preparing a sintered polycrystalline compact with substantial intercrystalline bonding from high pressure boron nitride which comprises:
   (a) forming a mixture consisting essentially of grains of high pressure boron nitride with a minor amount of a binder material consisting essentially of silicon, and an aluminum-containing material selected from the group consisting of aluminum alone, aluminum with aluminum nitride, aluminum with aluminum diboride, or aluminum with aluminum nitride and aluminum diboride;
   (b) subjecting the mixture to elevated temperature and pressure conditions sufficient to melt substantially all of the binder material and at which condition the high pressure boron nitride is thermodynamically stable; and
   (c) maintaining the elevated conditions for a time sufficient to allow for substantial intercrystalline bonding to thereby sinter the compact.

2. The process of claim 1, wherein the high pressure boron nitride is cubic boron nitride.

3. The process of claim 1 or 2, wherein the binder material is selected from the group consisting of a mixture of powders of silicon and the aluminum-containing material, powders of an alloy of aluminum and silicon, or a powdered mixture thereof.

4. The process of claim 3, wherein prior to subjecting the mixture to elevated temperature and pressure conditions at which the high pressure boron nitride is thermodynamically stable, the mixture is placed in a non-oxidizing atmosphere and subjected to an initial elevated temperature sufficient to cause reaction between the aluminum and the high pressure boron nitride.

5. the process of claim 4, wherein said initial elevated temperature is with in the range of 600° C. to 1200° C.

6. The process of claim 3, wherein the binder contains between about 5 to 50 percent by weight aluminum.

7. The process of claim 3, wherein the binder contains between about 15 to about 30 percent by weight aluminum.

8. The process of claim 3, wherein the mixture contains between about 5 to 20 volume percent binder.

9. The process of claim 2 wherein the binder material is a mixture of powders of silicon and the aluminum-containing material.

10. The process of claim 9, wherein the mixture contains between about 5 and 20 volume percent binder.

11. The process of claim 9, wherein the binder contains between about 5 to 50 percent by weight aluminum.

12. The process of claim 3, wherein the pressure is at least 45 kbar and the temperature is at least 1200° C.

13. A process for preparing a sintered polycrystalline compact from high pressure boron nitride comprising the steps of:

(a) placing immediately adjacent to a mass consisting essentially of high pressure boron nitride grains a mass of a binder material consisting essentially of a mixture of silicon and a aluminum-containing material selected from the group consisting of aluminum alone, aluminum with aluminum nitride, aluminum with aluminum diboride, or aluminum with aluminum nitride and a aluminum diboride;

(b) subjecting the boron nitride grains and binder material to elevated temperature and pressure conditions sufficient to melt substantially all of the binder materials and at which the high pressure boron nitride is thermodynamically stable, wherein substantially all of the silicon and aluminum infiltrates the mass of boron nitride crystals; and (c) maintaining the elevated conditions for a time sufficient to allow for substantial intercrystalline bonding to thereby sinter the compact.

14. The process of claim 13, wherein the high pressure boron nitride is cubic boron nitride.

15. The process of claim 13 or 14, wherein the binder material is selected from the group consisting of a mixture of powders of silicon and the aluminum-containing material, powders of an alloy of aluminum and silicon, or a powdered mixture thereof.

16. The process of claim 15, wherein the binder contains between about 5 to 20 percent by weight aluminum.

17. The process of claim 15, wherein the compact contains between about 5 to 20 volume percent binder.

18. The process of claim 15, wherein the pressure is at least 45 kbar and the temperature is at least 1200° C.

19. The compact produced according to the process of claims 1, 2, 9, 10, 11, 12, 13 or 14.

20. The compact produced according to the process of claim 3.

21. The compact produced according to the process of claim 4.

22. The compact produced according to the process of claim 15.

23. An article comprising the compact of claims 19, 20, 21 or 22.

* * * * *